(12) United States Patent
Tjader (10) Patent No.: US 7,434,315 B2
(45) Date of Patent: Oct. 14, 2008

(54) METHOD AND DEVICE FOR PIPE SPLITTING

(75) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 334 days.

(21) Appl. No.: 11/122,972

(22) Filed: May 5, 2005

(65) Prior Publication Data

US 2005/0262698 A1 Dec. 1, 2005

Related U.S. Application Data

(60) Provisional application No. 60/568,159, filed on May 5, 2004.

(51) Int. Cl.
*B23D 21/06* (2006.01)
(52) U.S. Cl. ......................... 30/103; 30/92.5; 166/55.2; 405/156
(58) Field of Classification Search ............... 30/92, 30/92.5, 93, 103; 405/156; 166/55.2
See application file for complete search history.

(56) References Cited

U.S. PATENT DOCUMENTS

| | | | | |
|---|---|---|---|---|
| 2,638,320 A | * | 5/1953 | Condra | 166/55.2 |
| 2,896,669 A | * | 7/1959 | Broadway et al. | 138/113 |
| 2,942,092 A | * | 6/1960 | Cammann | 219/69.2 |
| 3,181,302 A | * | 5/1965 | Lindsay | 405/156 |
| 4,903,406 A | * | 2/1990 | Schosek et al. | 30/92.5 |
| 5,171,106 A | * | 12/1992 | Rockower et al. | 405/156 |
| 5,439,320 A | * | 8/1995 | Abrams | 405/184.3 |
| 5,445,222 A | * | 8/1995 | Pritchard et al. | 116/298 |
| RE35,542 E | * | 6/1997 | Fisk et al. | 405/156 |
| 6,793,442 B2 | * | 9/2004 | Carter et al. | 405/184.3 |
| 7,172,370 B2 | * | 2/2007 | Schmidt | 405/184.3 |
| 2001/0018007 A1 | * | 8/2001 | Puttmann | 405/184.3 |
| 2003/0084764 A1 | * | 5/2003 | Wentworth | 83/13 |
| 2008/0008537 A1 | * | 1/2008 | Tjader | 405/184.3 |

* cited by examiner

*Primary Examiner*—Hwei-Siu C. Payer
(74) *Attorney, Agent, or Firm*—Schwegman, Lundberg & Woessner, P.A.

(57) ABSTRACT

A device and method for pipe replacement is shown. A pipe replacement device is shown that includes at least one scoring wheel to provide a more progressive cut that provides consistency in the split of the pipe. A pulling force is reduced using pipe replacement devices and methods in a splitting operation. A pipe replacement device is shown that includes at least one skid structures with a long and consistent profile. In methods shown, friction between a pipe replacement device and the pipe being split is reduced.

14 Claims, 8 Drawing Sheets

METHOD AND DEVICE FOR PIPE SPLITTING

CROSS REFERENCE TO RELATED APPLICATIONS

This application claims the benefit of U.S. Provisional Application Ser. No. 60/568,159, filed on May 5, 2004, which application is incorporated herein by reference.

TECHNICAL FIELD

This invention relates to devices and methods for pipe replacement. Specifically, this invention relates to ductile pipe material splitters.

BACKGROUND

Pipe such as cast iron, clay or ductile metal pipe has been used for connecting homes and creating networks for utilities such as water, sewer, or gas, etc. As pipes become old, they may crack or break, or for some other reason require replacement.

A technique known as pipe bursting is currently used as a convenient method to replace underground pipe without the need to dig up the pipe to be replaced. A pipe breaking device, such as an expander or a mole, is pulled by a cable through the existing pipe while it is still underground. The expander is designed to break, split or burst the pipe, and at the same time to expand the old pipe into the surrounding soil. The expansion of the old pipe allows the expander to pull a replacement pipe into place.

Pipe splitters typically use one or more cutting wheels to split old ductile pipe material such as ductile iron pipe, or other non-brittle materials. During splitting, the ductile pipe material resists splitting, and frequently stretches or tears. Stretching ductile material also requires large pulling force during a splitting operation.

What is needed is a splitter that provides a more clean and predictable cut. What is also needed is an improved expander design that increases the speed and decreases the power needed during a pipe bursting operation.

DETAILED DESCRIPTION

In the following detailed description, reference is made to the accompanying drawings which form a part hereof, and in which is shown, by way of illustration, specific embodiments in which the invention may be practiced. In the drawings, like numerals describe substantially similar components throughout the several views. In the following description, the term cable is defined to include metal cables, wire rope, or other lengths of material of suitable strength to pull devices as described below through a section of pipe. These embodiments are described in sufficient detail to enable those skilled in the art to practice the invention. Other embodiments may be utilized and structural, or logical changes, etc. may be made without departing from the scope of the present invention.

Figure 1:
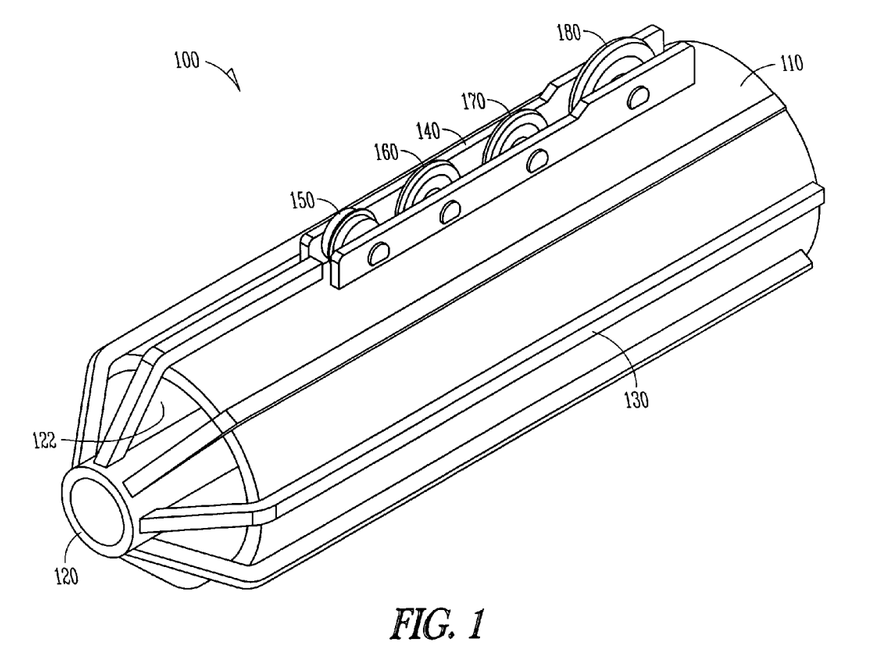
FIG. 1 shows an isometric view of a pipe splitter according to an embodiment of the invention.
Figure 2A:
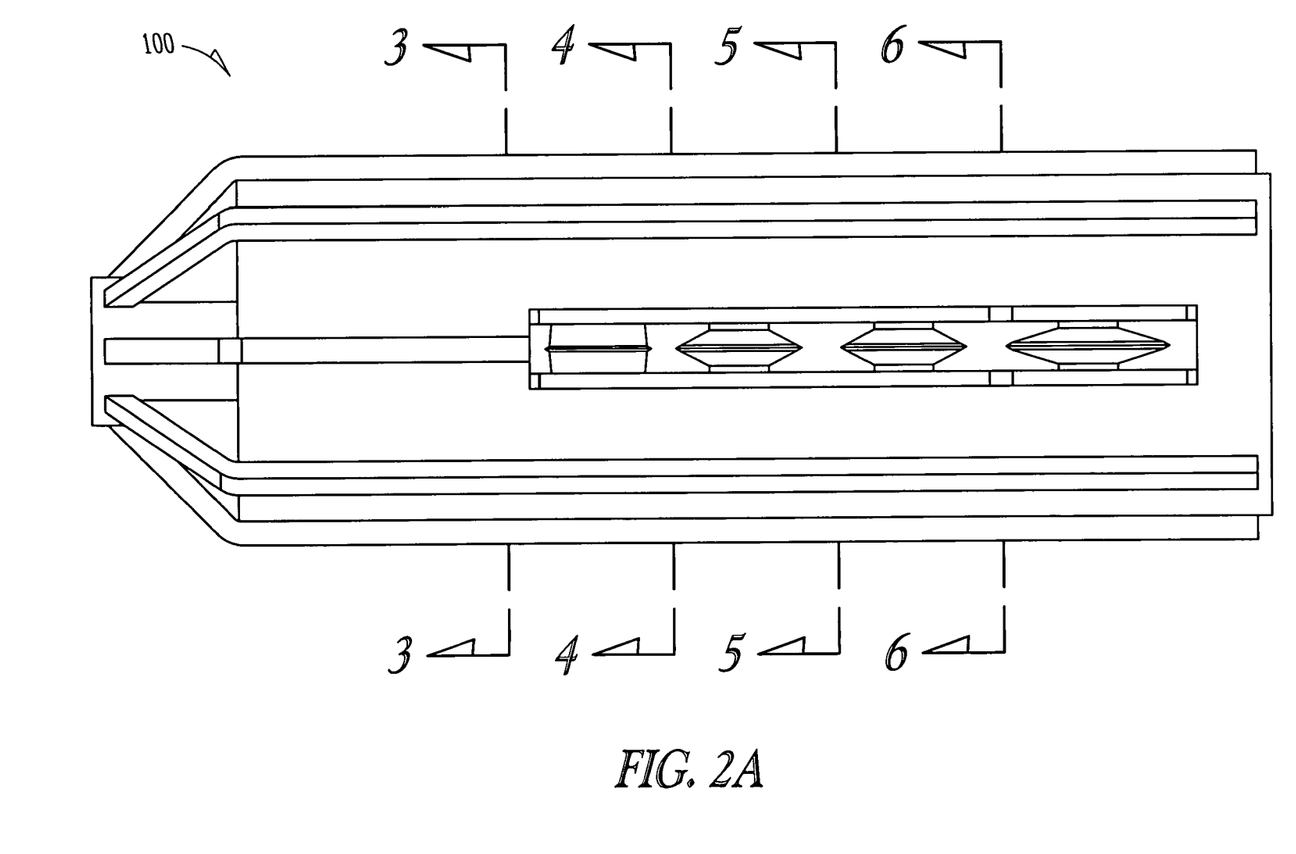
FIG. 2A shows a top view of a pipe splitter according to an embodiment of the invention.
Figure 2B:
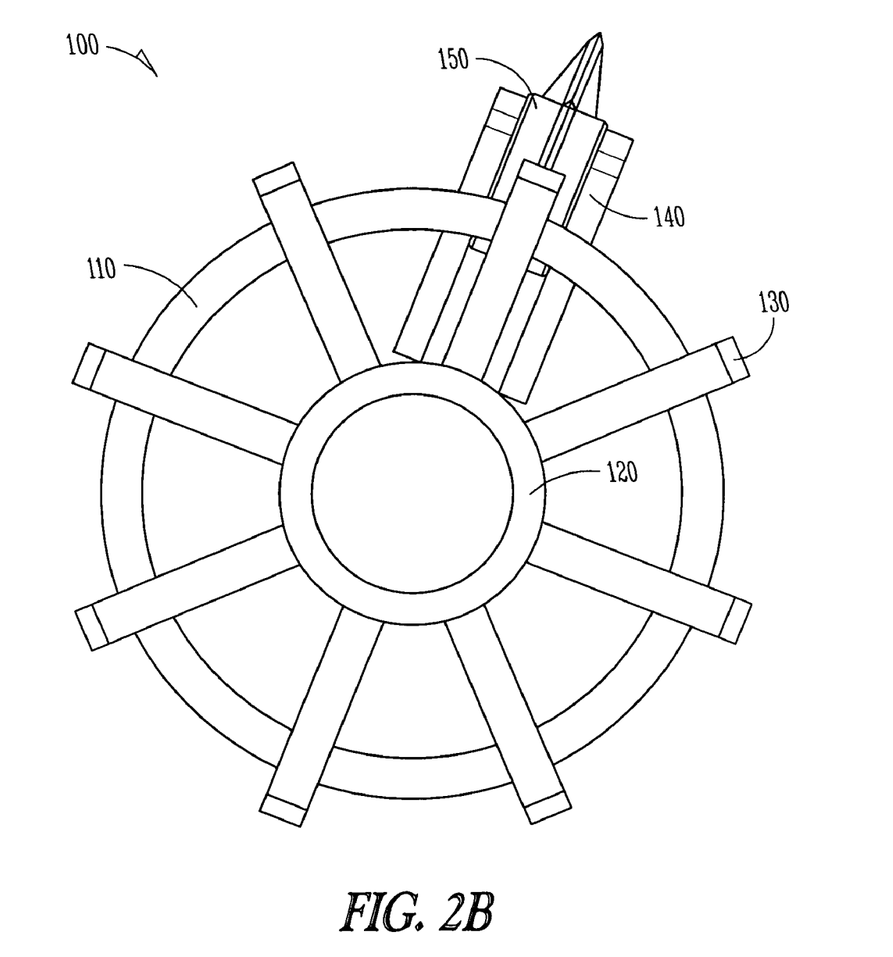
FIG. 2B shows an end view of a pipe splitter according to an embodiment of the invention.

FIG. 1 shows one embodiment of a pipe splitter 100. In one embodiment, the pipe splitter 100 includes an outer body 110, and an inner body 120, with a number of splined structures 122 coupling the inner body 120 to the outer body 110. In one embodiment, a number of skid structures 130 are coupled to the outside of the outer body 110. Skid structures 130 are used to contact an inner surface of an old pipe to be split. In one embodiment, the skid structures are formed from a material that provides a low coefficient of friction with the pipe to be split. In one embodiment, the skid structures 130 are formed from a steel or other material that is harder than the material of the pipe to be split.

The pipe splitter 100 further includes a cutter assembly 140 including a number of wheels. In one embodiment, the number of wheels are coupled to the cutter assembly by a number of bearings. In FIG. 1, four wheels are shown, however the invention is not so limited. In other embodiments, five wheels or more are used. In one embodiment, fewer than four wheels are used.

Figure 3:
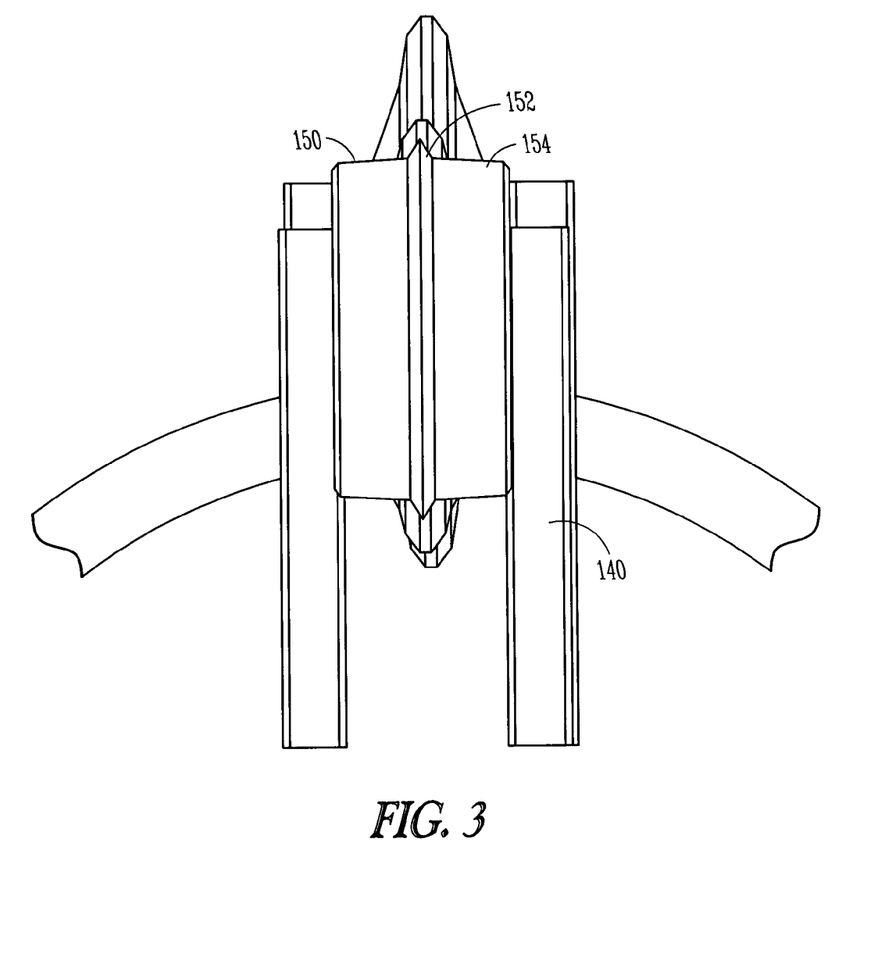
FIG. 3 shows a cross section view along line 3-3 of FIG. 2A according to an embodiment of the invention.
Figure 7:
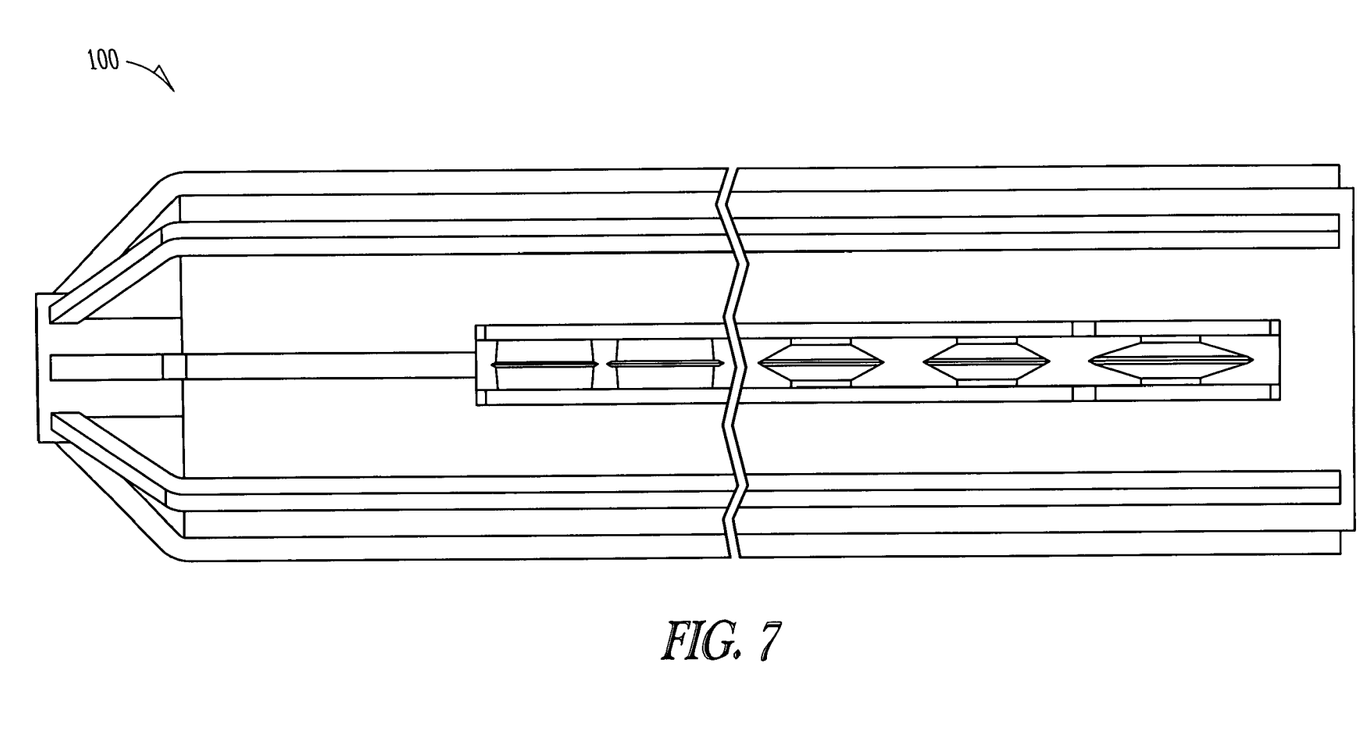
FIG. 7 shows a top view of a pipe splitter according to an embodiment of the invention.

In one embodiment, a first wheel 150 includes a scoring wheel. As shown in FIG. 3, the scoring wheel 150 includes a center sharpened portion 152 and a support portion or shoulder 154. In one example, the shoulder 154 extends outwardly from the sharpened portion 152 in a direction generally parallel to an axis of rotation of the scoring wheel 150. In one example, at least a portion of the shoulder 154 extends outwardly from the outer body 110, such that at least the portion of the shoulder 154 is disposed above the frame, as shown in FIG. 3. In one example, the shoulder 154 is configured to contact the pipe to inhibit the sharpened portion 152 of the scoring wheel 150 from cutting completely through the pipe. For instance, in one example, a distance between a tip of the sharpened portion 152 and the shoulder 154 is less than a thickness of the pipe, such that the sharpened portion 152 is constrained from cutting completely through the pipe by contacting of the shoulder 154 with the pipe. In one method of operation, the scoring wheel 150 functions to begin a split in the pipe, without being too aggressive about the split in the first wheel. In one embodiment, this provides an advantage where the splitting operation is performed more gradually, thereby requiring less pulling force as the splitter 100 is pulled through the old pipe. As shown, for example, in FIG. 7, other embodiments include multiple scoring wheels. In one embodiment, multiple scoring wheels are used with a progressive amount of scoring.

Figure 4:
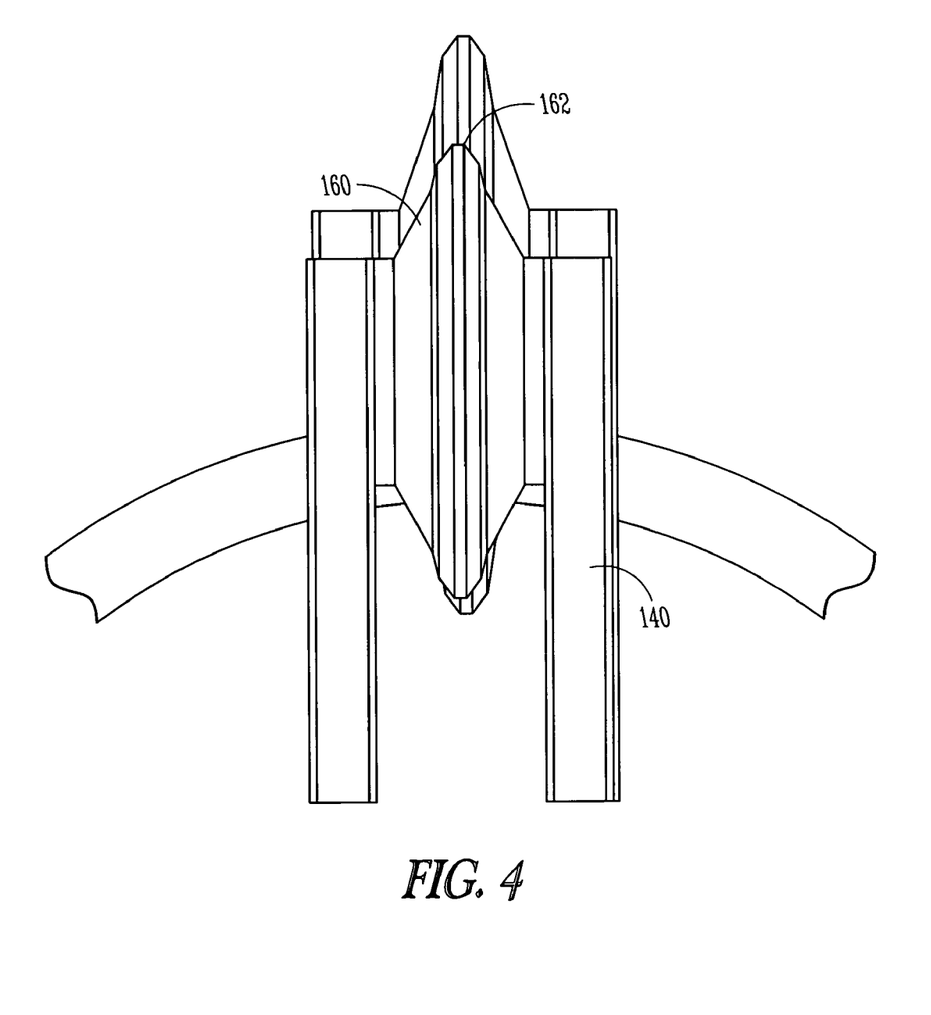
FIG. 4 shows a cross section view along line 4-4 of FIG. 2A according to an embodiment of the invention.
Figure 5:
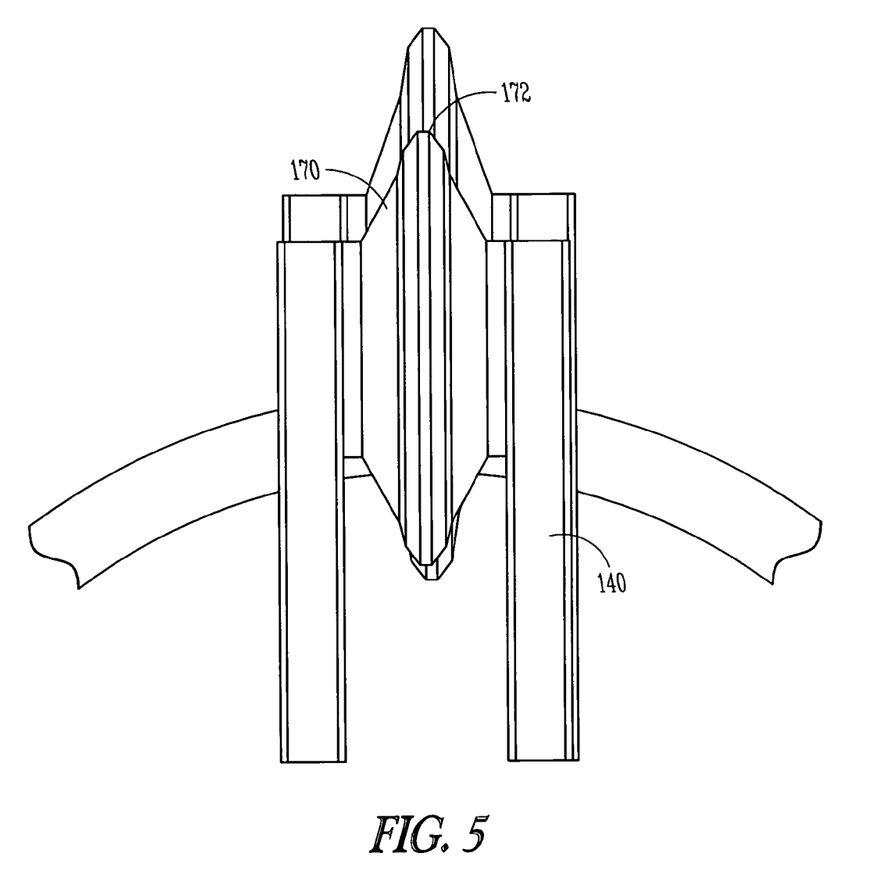
FIG. 5 shows a cross section view along line 5-5 of FIG. 2A according to an embodiment of the invention.

FIG. 4 shows a first cutting wheel 160. In one embodiment, a sharp cutting edge 162 is included, without any support portion or shoulder. FIG. 5 shows a second cutting wheel 170. In one embodiment, a sharp cutting edge 172 is included, without any support portion or shoulder, similar to cutting wheel 160. In one embodiment, the second cutting wheel 170 is substantially the same diameter as the first cutting wheel 160.

Figure 6:
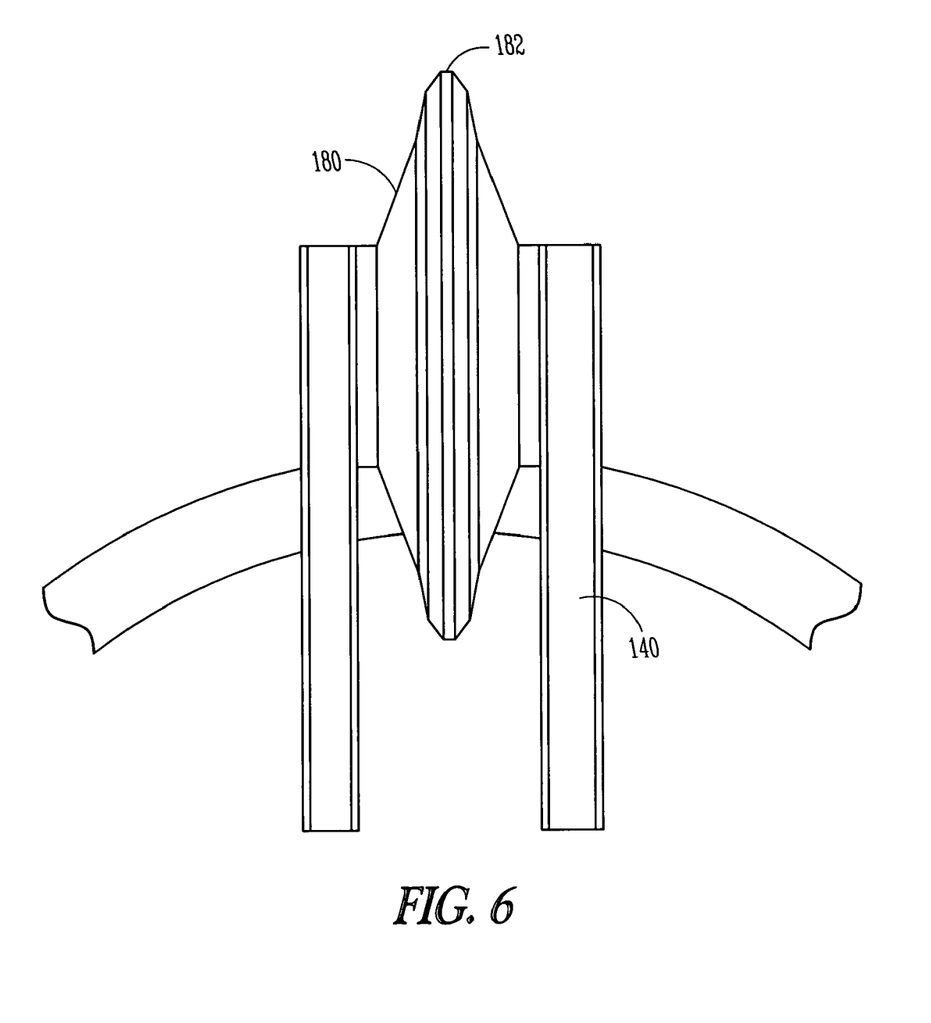
FIG. 6 shows a cross section view along line 6-6 of FIG. 2A according to an embodiment of the invention.

FIG. 6 shows a third cutting wheel 180. In one embodiment, a sharp cutting edge 182 is included, without any support portion or shoulder, similar to cutting wheels 160 and

170. In one embodiment, the diameter of the third cutting wheel 180 is larger than the diameter of the first cutting wheel 160 and the second cutting wheel 170.

In one embodiment, a diameter of each wheel such as cutting wheel 160, and the presence or absence of a support portion as in scoring wheel 150 determine an amount of cutting or scoring that each wheel performs. By selecting a combination of wheels including a scoring wheel or scoring wheels and various diameters of wheels, a progressive splitting operation is performed with lower pulling force. A clean split results using embodiments described in the present disclosure, which not only reduces the pulling force, but also makes the pulling force more consistent.

In one embodiment, use of long, consistent profile skid structures 130 further provides a consistent pulling force. This is in contrast to a device such as a guide roller that provides a more local force against a small portion of a side of the pipe.

CONCLUSION

Embodiments of pipe splitters as described above have a number of advantages. Using at least one scoring wheel, as shown in selected embodiments above, allows a more progressive cut that provides consistency in the split of the pipe, and reduces pulling force in the splitting operation. Another advantage includes the use of skid structures with a long and consistent profile. The skid structures are inexpensive to manufacture, and help to distribute forces from the pipe during a splitting operation over a larger surface area than a guide roller. However, a ribbed skid structure configuration keeps an amount of surface area in contact with a side of the pipe to a selected amount. Too much surface area in contact with a side of the pipe can also produce high friction.

While a number of advantages of embodiments of the invention are described, the above lists are not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

I claim:

1. A pipe splitter, comprising:
   a frame sized to fit within a pipe;
   a number of rotating wheels mounted along a longitudinal axis of the frame, including:
      a scoring wheel that defines a scoring axis, wherein the scoring wheel includes a sharpened portion and a shoulder extending outwardly from the sharpened portion in a direction generally parallel to an axis of rotation of the scoring wheel, at least a portion of the shoulder extending outwardly from the frame, the shoulder configured to contact the pipe to inhibit the sharpened portion of the scoring wheel from cutting completely though the pipe; and
      at least one cutting wheel aligned with the scoring wheel and located in sequence after the scoring wheel.

2. The pipe splitter of claim 1, wherein the number of rotating wheels includes multiple scoring wheels in sequence prior to the at least one cutting wheel.

3. The pipe splitter of claim 2, wherein the multiple scoring wheels provide progressively deeper score marks.

4. The pipe splitter of claim 1, wherein at least one cutting wheel includes:
   a first cutting wheel having a larger diameter than the scoring wheel;
   a second cutting wheel having substantially the same diameter as the first cutting wheel; and
   a third cutting wheel having a larger diameter than the first cutting wheel.

5. The pipe splitter of claim 1, further including at least one skid structure protruding from a surface of the frame, wherein the skid structure is formed from a harder material than the pipe to be split.

6. The pipe splitter of claim 5, wherein the at least one skid structure is disposed in line with the number of rotating wheels.

7. The pipe splitter of claim 1, wherein the frame includes an inner body and an outer body.

8. The pipe splitter of claim 7, wherein the inner body is coupled to the outer body by at least one splined structure including at least one skid structure.

9. A pipe splitter, comprising:
   a frame sized to fit within a pipe, the frame including an inner body and an outer body;
   a number of rotating wheels mounted along a longitudinal axis of the frame, including:
      a scoring wheel that defines a scoring axis, wherein the scoring wheel includes a sharpened portion and a support portion;
      at least one cutting wheel aligned with the scoring wheel and located in sequence after the scoring wheel; and
   at least one splined structure including at least one skid structure protruding from a surface of the frame, the at least one splined structure coupling the inner body to the outer body.

10. The pipe splitter of claim 9, wherein the at least one skid structure is formed from a harder material than the pipe to be split.

11. The pipe splitter of claim 9, wherein the at least one skid structure is substantially continuous along a longitudinal length of the frame.

12. The pipe splitter of claim 9, wherein the at least one skid structure is disposed in line with the number of rotating wheels.

13. The pipe splitter of claim 9, wherein the support portion of the scoring wheel includes a shoulder extending outwardly from the sharpened portion in a direction generally parallel to an axis of rotation of the scoring wheel, the shoulder configured to inhibit the scoring wheel from cutting completely through the pipe.

14. The pipe splitter of claim 9, wherein the number of rotating wheels includes multiple scoring wheels in sequence prior to the at least one cutting wheel.

* * * * *